United States Patent
Kanthasamy et al.

(10) Patent No.: US 9,922,453 B1
(45) Date of Patent: Mar. 20, 2018

(54) SHRINK WRAP GENERATION SYSTEMS AND METHODS

(71) Applicant: MSC.Software Corporation, Santa Ana, CA (US)

(72) Inventors: Kunaseelan Kanthasamy, Irvine, CA (US); Xiangrong Li, Torrance, CA (US)

(73) Assignee: MSC.Software Corporation, Newport Beach, CA (US)

( * ) Notice: Subject to any disclaimer, the term of this patent is extended or adjusted under 35 U.S.C. 154(b) by 1139 days.

(21) Appl. No.: 13/887,249

(22) Filed: May 3, 2013

(51) Int. Cl.
 *G06F 17/50* (2006.01)
 *G06T 17/00* (2006.01)

(52) U.S. Cl.
 CPC ................... *G06T 17/005* (2013.01)

(58) Field of Classification Search
 CPC .................................. G06T 17/005
 USPC ............................................. 703/1
 See application file for complete search history.

(56) References Cited

U.S. PATENT DOCUMENTS

| | | | | |
|---|---|---|---|---|
| 6,021,358 A * | 2/2000 | Sachs | ............... | G05B 19/40937 700/118 |
| 6,633,837 B1 * | 10/2003 | Dye | ........................ | G06F 8/30 703/10 |
| 7,373,284 B2 * | 5/2008 | Stabelfeldt | .......... | G06F 17/5018 345/419 |
| 7,499,841 B2 * | 3/2009 | Hoffman | ................ | G06F 17/50 702/138 |
| 7,881,818 B2 * | 2/2011 | Van Bael | ............... | G06F 17/50 229/89 |
| 7,974,674 B2 * | 7/2011 | Hauck | .................. | A61B 5/6885 600/374 |
| 2002/0072884 A1 * | 6/2002 | El-Ratal | ................. | G06F 17/50 703/2 |
| 2005/0134586 A1 * | 6/2005 | Koo | ........................ | G06T 17/20 345/423 |
| 2007/0088531 A1 * | 4/2007 | Yuan | ...................... | G06T 17/20 703/2 |
| 2013/0103369 A1 * | 4/2013 | Huynh | ............... | G06F 17/5018 703/2 |

OTHER PUBLICATIONS

Jeong et al., "Direct reconstruction of displaced subdivision surface from unorganized points", 2001, IEEE Proceedings Computer Graphics and Applications, Ninth Pacific Conference, pp. 1-9.*

(Continued)

*Primary Examiner* — Juan Ochoa
(74) *Attorney, Agent, or Firm* — Foley & Lardner LLP

(57) ABSTRACT

A system and method for generating a shrink wrap around a model. The method includes detecting non-manifold edges in an octree generated shrink wrap by counting a number of faces adjacent to each edge, removing the non-manifold edges by cloning the edges or vertices shared by the non-manifold edge, and generating a first projection for the wrapper by moving each wrapper vertex towards a nearest location on the model. The method includes determining a set of wrapper vertices for reprojection based on the computation of a projection angle and a rotational angle and generating a second projection for the set the wrapper vertices using a seed-based closest point method or the center of the adjacent wrapper vertices.

15 Claims, 15 Drawing Sheets

(56) References Cited

OTHER PUBLICATIONS

Ulf Labsik, "Multiresolution mesh processing for triangular and tetrahedral meshes", Nov. 2002, Dissertation Universität Erlangen-Nürnberg, pp. 1-164.*

Kobbelt et al., "A shrink wrapping approach to remeshing polygonal surfaces", 1999, Computer Graphics Forum. vol. 18. No. 3. Blackwell Publishers Ltd, pp. 1-11.*

Liu et al., "Finding surface correspondences using symmetry axis curves", 2012, Computer Graphics Forum. vol. 31. No. 5. Blackwell Publishing Ltd, pp. 1-10.*

Lee et al., "Surface mesh generation for dirty geometries by shrink wrapping using cartesian grid approach", 2006, Proceedings of the 15th International Meshing Roundtable, Springer Berlin Heidelberg, pp. 393-410.*

* cited by examiner

SHRINK WRAP GENERATION SYSTEMS AND METHODS

BACKGROUND

The present disclosure generally relates to computer-aided engineering (CAE) systems. The present disclosure relates more specifically to generating a shrink wrap around a model in CAE systems.

Generating a membrane around an existing finite element model may allow a user to conduct acoustic or fluid simulations. A mesh-fitting scheme may work for simple surfaces that are symmetrical. However, the mesh-fitting scheme may fail to generate good wrappers around an unsymmetrical object. The surface mesh may provide an approximation to the finite element model and may include multiple wrinkles and/or extreme stretching.

SUMMARY

One embodiment relates to systems and methods that include detecting non-manifold edges in an octree generated shrink wrap by counting a number of faces adjacent to each edge, reconnecting the non-manifold edges after separating or cloning the edges or cloning a vertices shared by the non-manifold edge, and generating a first projection for the wrapper by moving each wrapper vertex towards a nearest location on the model, the first projection comprising a projection angle and a rotational angle. The method includes determining a set of wrapper vertices for reprojection based at least partially on the projection angle exceeding a maximum projection angle threshold value or the rotational angle exceeding a maximum rotational angle threshold value and generating a second projection for the set the wrapper vertices using a seed-based closest point method or the center of the adjacent wrapper vertices for the second projection.

In another embodiment the method for generating a wrapper includes generating an a wrapper around the model using an octree structure and shrinking the wrapper towards the model. In some embodiments shrinking the wrapper towards the model includes generating a first projection for the wrapper by moving each wrapper vertex towards a nearest location on the model, the first projection comprising a projection angle and a rotational angle, determining a set of wrapper vertices for reprojection (or repositioning) based at least partially on the projection angle exceeding a maximum projection angle threshold value or the rotational angle exceeding a maximum rotational angle threshold value, generating a second projection for the set the wrapper vertices using a seed-based closest point method or the center of the adjacent wrapper vertices for the second projection.

Yet another embodiment relates to a computer-readable storage medium having machine instructions stored therein, the instructions being executable by a processor to cause the processor to perform operations includes detecting non-manifold edges in an octree generated shrink wrap by counting a number of faces adjacent to each edge, reconnecting the non-manifold edges after separating or cloning the edges or cloning a vertices shared by the non-manifold edge, and generating a first projection for the wrapper by moving each wrapper vertex towards a nearest location on the model, the first projection comprising a projection angle and a rotational angle. The method includes determining a set of wrapper vertices for reprojection based at least partially on the projection angle exceeding a maximum projection angle threshold value or the rotational angle exceeding a maximum rotational angle threshold value and generating a second projection for the set the wrapper vertices using a seed-based closest point method or the center of the adjacent wrapper vertices for the second projection.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
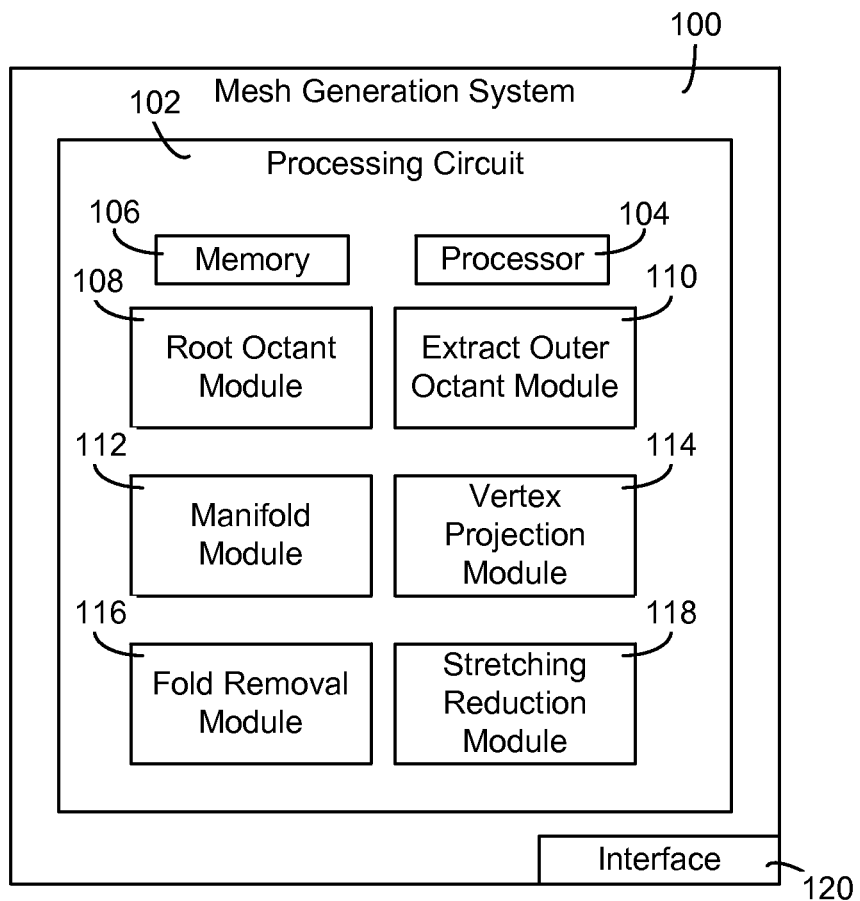
FIG. 1 is a block diagram of a mesh generation system, according to an exemplary embodiment.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring generally to the figures, systems and methods for generating shrink wrapper around a model (e.g. finite element (FE), Computer Aided Design (CAD), Computer Aided Engineering (CAE)). The systems and methods herein may be used to optimize a CAD/CAE model design and generating a shrink-wrap. Various embodiments include membrane generation and/or wrapper generation methods that surround a finite element (FE) model. Mimicking the plastic membrane wrapping around a physical object, the embodiments include constructing a watertight (completely connected and congruent) surface mesh by extracting the FE model from an overlaying octree, and shrinking the membrane by projecting the wrapper onto the FE model. The surface mesh provides an approximation of the given finite element model, suitable for later tetrahedral volume mesh generation and for acoustic or fluid simulation.

The mesh-fitting methods generate wrappers for simple, uncomplicated surfaces. However, mesh-fitting methods do not generate desirable results for more complicated objects (e.g. multiple turns bends edges that connected surfaces that face different angles or curved edges). One reason for the failure of the mesh-fitting method can be explained by observing the behavior of real shrink wrapping material. In fact, most mesh fitting methods generate severe wrinkles or extreme stretching.

Mathematically the adverse result can be explained by the fact that the FE model and the shrink-wrap have rather different surface metrics, i.e., their first fundamental forms differ significantly. Hence, when fitting the shrink-wrap, there are regions where the shrink-wrap has to be stretched extremely and regions where there is too much material and hence creases are generated from superfluous shrink-wrap. A shrunk subdivision connectivity mesh creates similar issues such as creases and ripples. The stretching in some regions results in significantly larger triangles and in regions with relatively high vertex density, there can be creases and ripples.

FIG. 1 is a block diagram of a shrink wrap generation system, according to an exemplary embodiment. Shrink-wrap generation system 100 may be part of a CAE system or computer-aided design (CAD) system. Shrink-wrap generation system 100 may be generally configured to receive a FE model being designed using the CAE system or CAD system. The model may be designed by a user of the CAE system or CAD system, and may include any number of modifications. Shrink-wrap generation system 100 may receive the FE model with topological information and the FE model such that the modifications do not compromise the CAD model or change the geometric constraints of the model.

Shrink-wrap generation system 100 may be configured to generate a shrink wrap around a model. Shrink-wrap generation system 100 may receive the finite element model. Shrink-wrap generation system 100 may be used to create a shrink wrap using various embodiments. Shrink-wrap generation system 100 may generally be used to overlay a root octant on the FE model, recursively refine octants based on intersection with the model, extract zigzagged outer octant skin, separate non-manifoldness on various faces, project the closest location on the FE model, correct projections, remove folding and degeneracy and contractions, and avoid extreme stretching in various embodiments.

Shrink-wrap generation system 100 is shown to include a processing circuit 102 including a processor 104 and memory 106 which may be part of a work station or other computer. Processor 104 may be implemented as a general purpose processor, an application specific integrated circuit (ASIC), one or more field programmable gate arrays (FPGAs), a group of processing components, or other suitable electronic processing components. Memory 106 is one or more devices (e.g., RAM, ROM, Flash memory, hard disk storage, etc.) for storing data and/or computer code for completing and/or facilitating the various processes described herein. Memory 106 may be or include non-transient volatile memory or non-volatile memory or non-transitory computer readable storage media. Memory 106 may include database components, object code components, script components, or any other type of information structure for supporting the various activities and information structures described herein. Memory 106 may be communicably connected to processor 104 and includes computer code or instructions for executing one or more processes described herein.

Processing circuit 102 is shown to include various modules for executing the activities described herein. Processing circuit 102 may include a root octant module 108 and extract outer octant module 110. Modules 108, 110 may generally relate to generating an initial wrapper around the FE model that was received to include topological information and dirty models (i.e., unconnected geometry including unmeshable, overlapping or intersecting surfaces). The root octant module 108 may perform various functions in one embodiment. Module 108 may apply adaptively refined octree techniques to create a shrink wrap. Module 108 may find the bounding box of the FE model, and expand them into a cube (or octant). For each triangle in FE model, module 108 may determine the portion of the FE model that is intersecting with or contained by the octant. In the case where the FE model is intersecting or contained within the octant the module 108 may refine the octant into eight child octants. Next the module 108 may test each child octant with the triangle (from the FE model) for containment or intersection. In the case where the FE model intersects or is contained within the child octant and the child octant size is equal or less than h (wrap mesh size input received from user or predetermined by the system) the child is marked. The next child octant is processed similarly. The process is repeated recursively to refine the child octant to be of a size that is equal to or less than desired wrap mesh size. Module 108 may output an adaptively refined octree and all leaf octants that intersect with FE model are marked.

Extract outer octant module 110 may be implemented as a single processor unit, multiple processor units or a distributed processor unit. The module 110 may include a non-transitory storage medium that is configured to interact with the various other modules from the shrink-wrap generation system 100. The extract outer octant module 110 may receive as input the output generated by the root octant module 108. As described in greater detail below the extract outer octant module 110 may perform various steps as described below with respect to FIG. 9.

Processing circuit 102 may include a manifold module 112. The manifold module 112 may receive the surface wrapper from the extract outer octant module 110 and separate the non-manifoldness in the surface wrapper. The manifold module 112 may split squares in the surface wrapper into two triangles. The manifold module 112 may be implemented as a single processor unit, multiple processor units or a distributed processor unit. The module 110 may include a non-transitory storage medium that is configured to interact with the various other modules from the shrink-wrap generation system 100. As described in greater detail below the manifold module 112 may perform various steps as described below with respect to FIG. 10.

Processing circuit 102 is shown to include a vertex projection module 114 configured to update locations of the vertex to be closer to the FE model. The vertex projection module 114 may receive as input the manifold surface wrapper from module 112 and the FE model. As described in greater detail below vertex projection module 114 may perform various steps as described below with respect to FIG. 11. The vertex projection module 114 may determine a seed face (or seed faces) for each undesired wrapper vertex, compute a new target location, compute the center of the nearby vertices and compare the new target with the center and move the vertex to be closer to the FE model. The vertex projection module 114 may output a surface wrapper projected into an FE model.

Processing circuit 102 includes a fold removal module 116. As described in greater detail below fold removal module 116 may perform various steps as described below with respect to FIG. 12. The fold removal module 116 receives projected surface wrapper from the vertex projection module 114. The fold removal module 116 may determine whether the face has degenerated into a segment or a point. After determining that the face has degenerated the fold removal module 116 may apply collapse or swap operation to remove the face. The fold removal module 116 may generate a new surface wrapper with the folding and degeneracy being removed. The fold removal module 116 may be implemented as a single processor unit, multiple processor units or a distributed processor unit. The fold removal module 116 may include a non-transitory storage medium that is configured to interact with the various other modules from the shrink-wrap generation system 100.

The shrink-wrap generation system 100 includes a extreme stretching module 118 that is configured to remove any triangles that are being extremely stretched compared to the area occupied by the other triangles in the shrink-wrap. The stretching module 118 may traverse edges of the surface wrapper. The stretching module 118 may select two end vertices of the edge. Next, the stretching module 118 may select two FE model faces associated with the two end vertices, select the two geometry faces associated with these two FE-model faces. In the case where the two associated geometry faces is different, and/or the edge length is longer than 1.5 times h (h is the input mesh size parameter), split the edge at its mid-point. As described in greater detail below fold stretching module 118 may perform various steps as described below with respect to FIG. 13.

Mesh generation system 100 is shown to include an interface 120 configured to receive CAD model information from the CAE system. Interface 120 may further be configured to receive any type of user input or other input related to the process of mesh morphing and smoothing.

Figure 2:
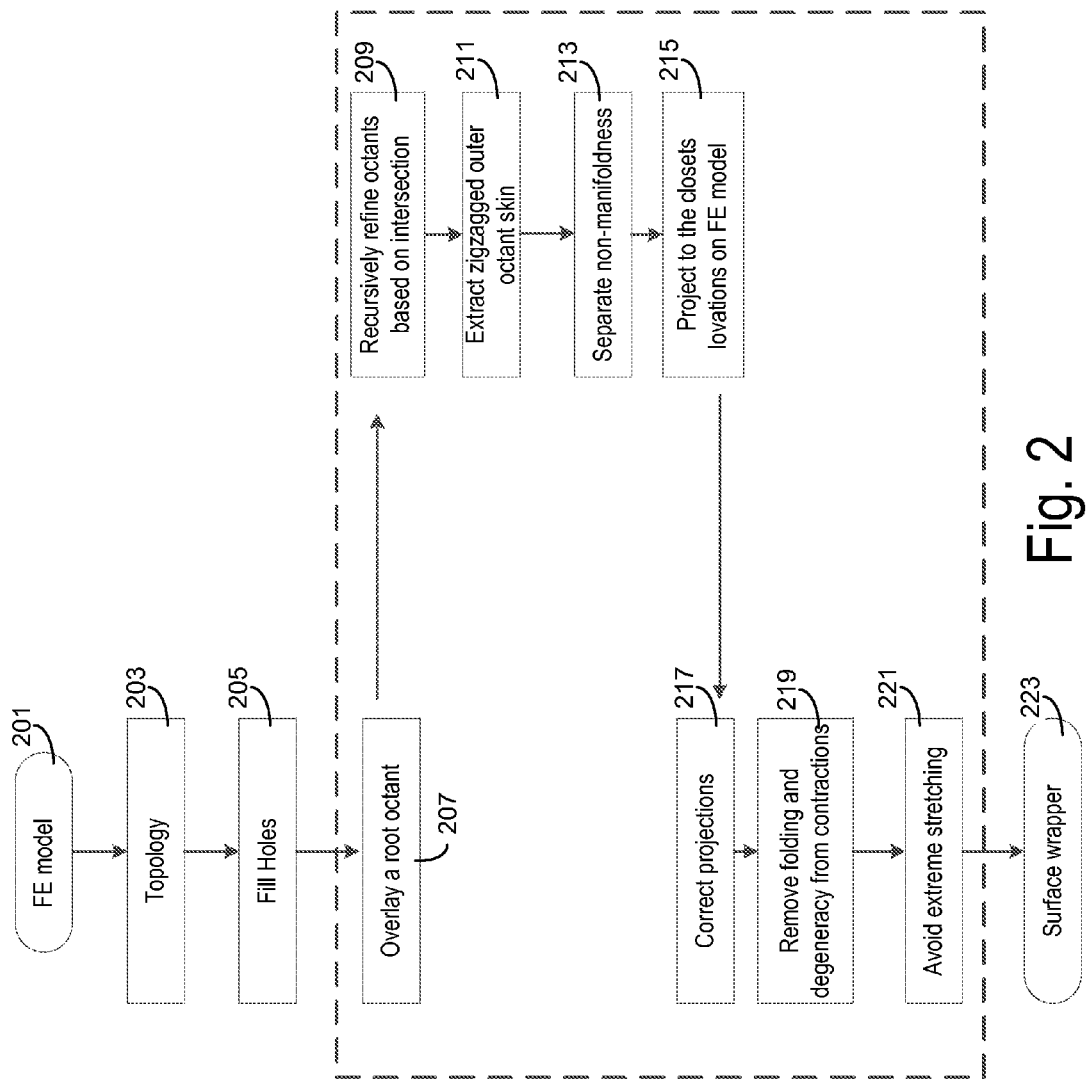
FIG. 2 is a flow chart illustrating a process for designing and modifying a wrapper around model, according to an exemplary embodiment.

FIG. 2 is a flow chart illustrating a process 200 for designing and modifying a wrapper around a model, according to an exemplary embodiment. Process 200 includes various steps such as but not limited to steps 201, 203, 205, 207, 209, 211, 213, 215, 217, 219, 221, and 223. FIG. 2 provides a process 200 that converts a structural FE model for acoustic or fluid simulations, where the shrink-wrap method plays a central role. The shrink-wrap part has been highlighted using the dashed box. The input of the method includes a FE model with topology information, including dirty models (very unconnected geometry and some of the geometry may not be meshable, overlapping or intersecting surfaces), the mesh size of the wrapper to be generated, h, and the distance from the wrapper to finite element model, d. The process 200 includes of two stages generating an initial wrapper and shrinking the wrapper toward the FE model.

In the first stage a rough approximation of the input FE model is constructed in step 207, 209, 211, and 213. Step 207 computes the bounding box of the FE model, and expands it into a cube serving as the root octant (bounding box expanded into a cube). Step 209 recursively refine the octants using octree structure into eight child octants until the given mesh size h is reached or the child octant does not contain/intersect the FE model, and mark all intersecting leaf octants. Recursive octree algorithms are being applied to shrink wrap generation.

Process 200 includes step 207 where a recursive octree structure is formed around the FE model. The recursive octree structure is refined in step 209 based on the octant's intersection with the FE model. Next in step 211 the zigzagged outer octant skin is extracted. At step 213, non-manifoldness is determined and separated. Next at step 215 the wrapper vertices are projected to the closest location on the FE model. At step 217, the projections from step 215 are corrected. At step 219 the folds and the degeneracy from contractions is removed. Next extreme stretching is detected and corrected by splitting triangles, at step 221. At step 223 the surface wrapper is generated.

Figure 3A:
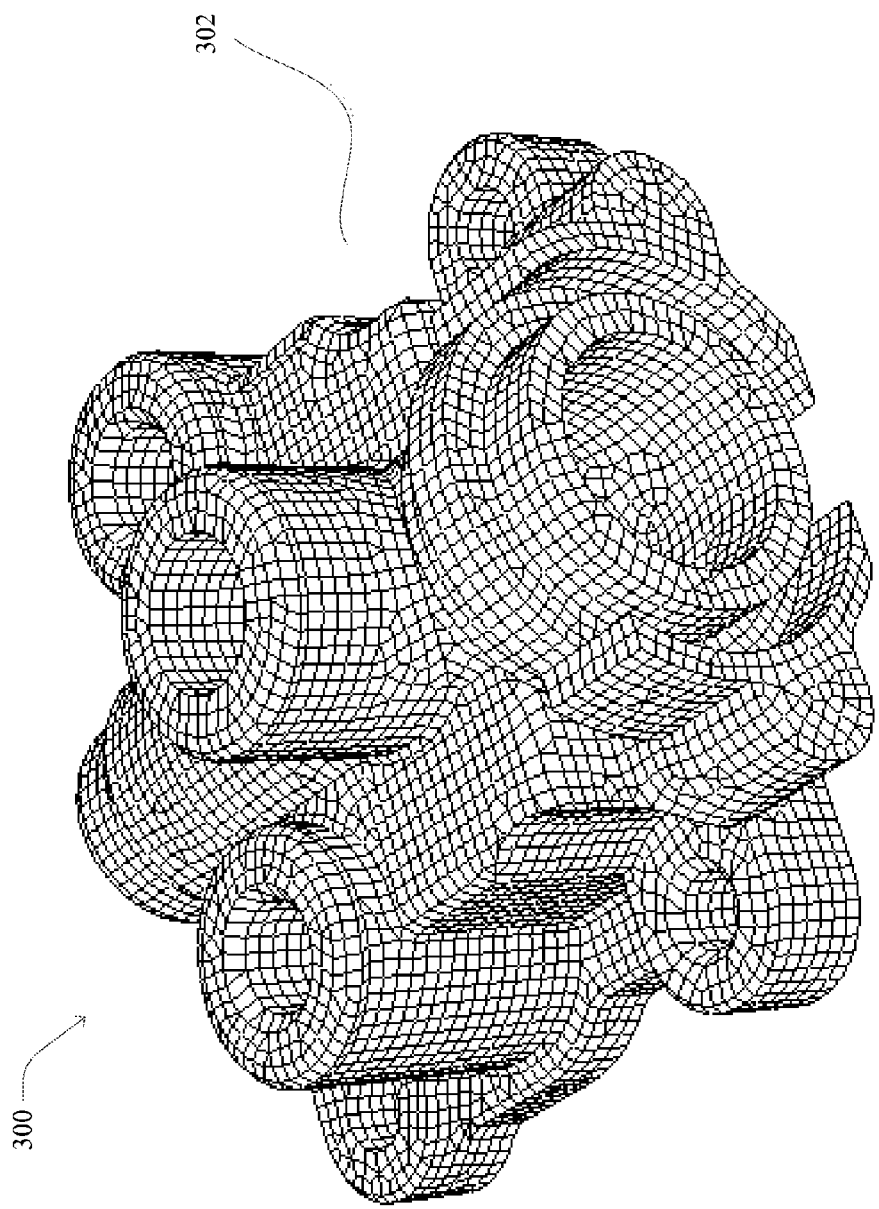
FIG. 3A is a model to be wrapped.
Figure 3B:
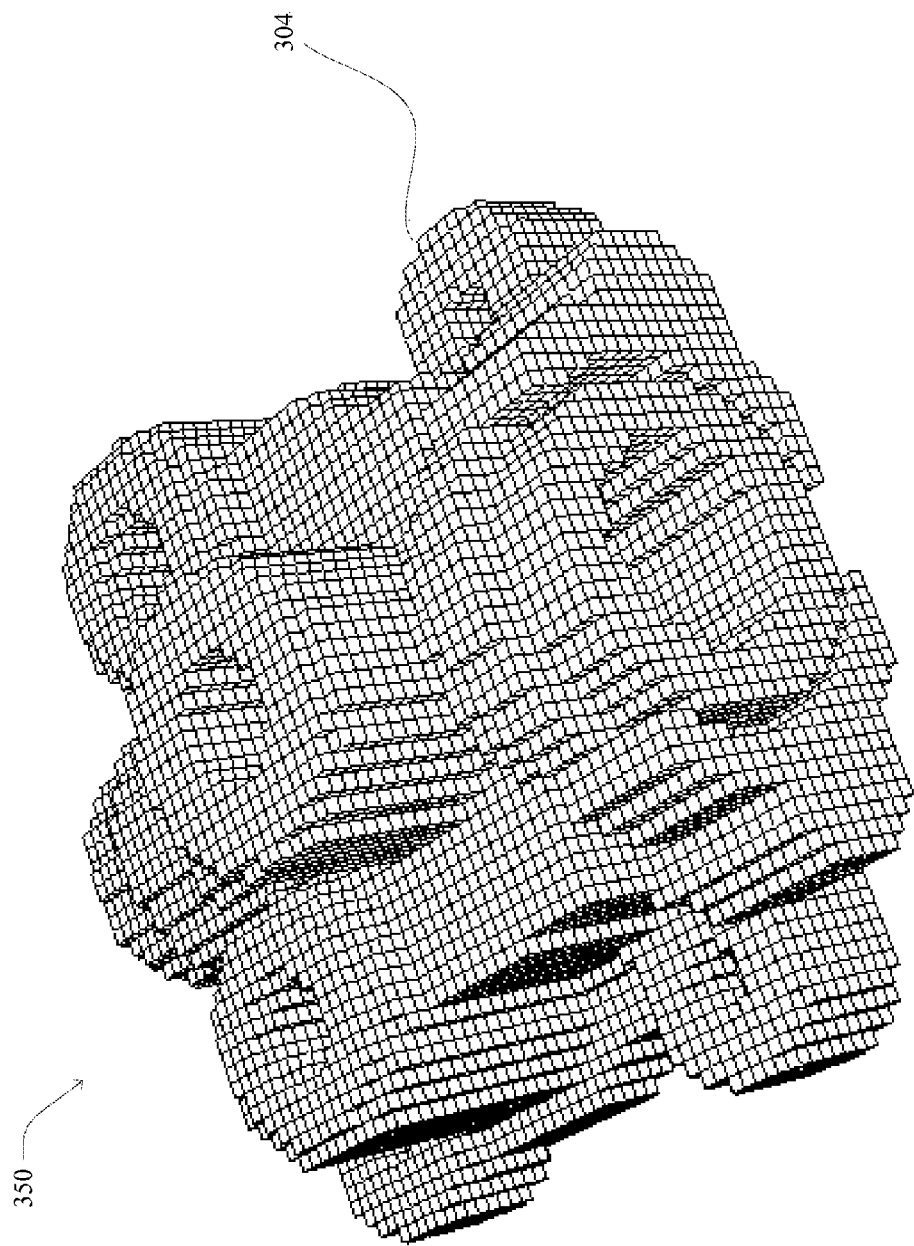
FIG. 3B is a model with octree cube elements around the model.

FIG. 3A is an engine model to be wrapped. FIG. 3B is a model with octree cube elements around the model according to step 207-211 above. The root octant module 108 may generate the octree elements. Geometrically, the initial wrapper is far from the FE model as well as topologically. The second stage improves above zigzagged wrapper by removing non-manifold edges and projecting (or shrinking) it toward the FE model in step 213, 215, 217, 219, and 221.

Figure 4:
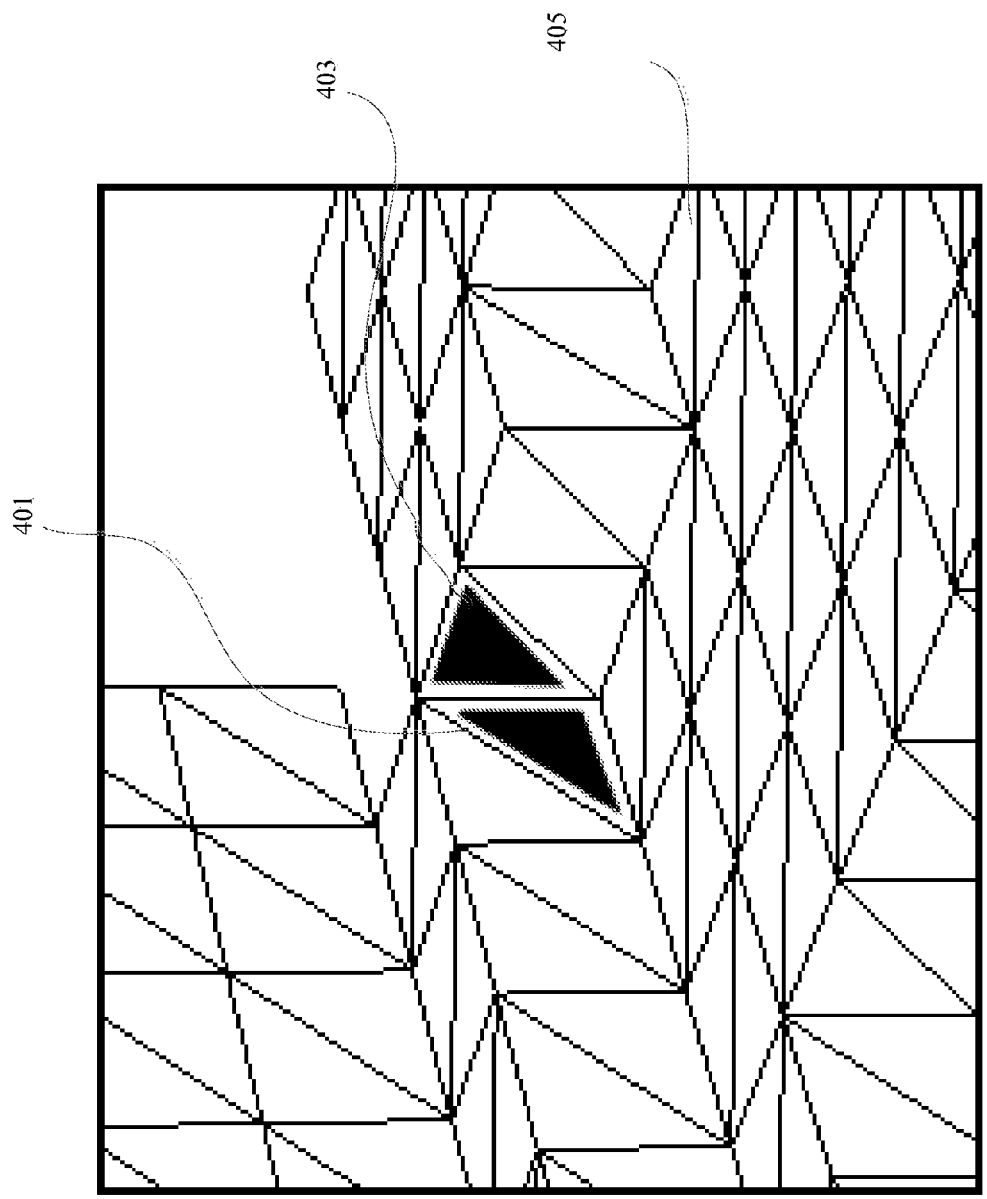
FIG. 4 illustrates an example wrapper that may be corrected according to an exemplary embodiment.

FIG. 4 illustrates an example wrapper that may be corrected according to an exemplary embodiment. In FIG. 4, the non-manifoldness is detected and removed. The surface mesh is considered manifold when each edge connects two faces. Although the physical wrapper is always manifold, the zigzagged wrapper from stage one may not be manifold and may need to be fixed.

Figure 5A:
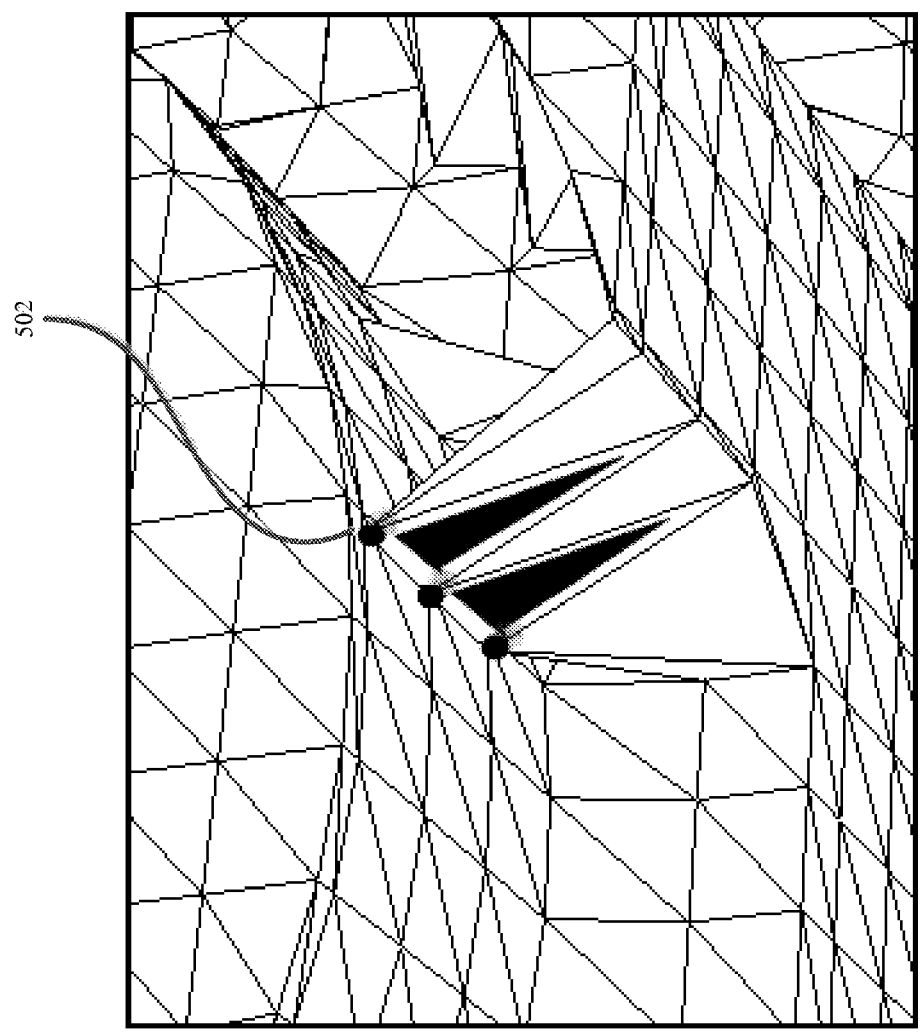
FIG. 5A illustrates an example wrapper that may be corrected according to an exemplary embodiment.
Figure 5B:
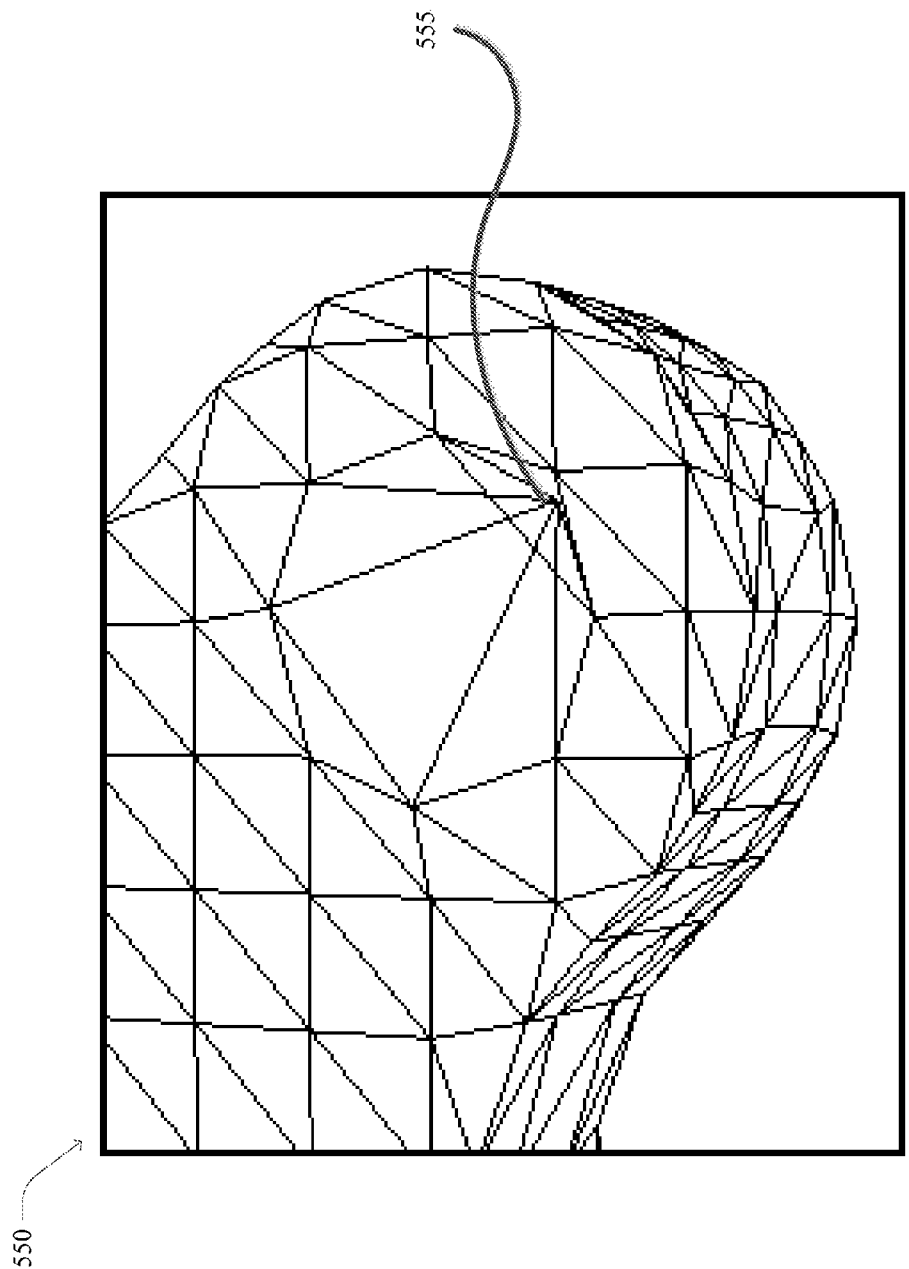
FIG. 5B illustrates an example wrapper that may be corrected according to an exemplary embodiment.

FIG. 5A illustrates an example wrapper that may be corrected according to an exemplary embodiment. FIG. 5B illustrates an example wrapper that may be corrected according to an exemplary embodiment.

In the second stage, the method performs projections twice, an initial projection plus a secondary correction, to avoid the expensive computation of shrink destinations. In initial projection, the nearest location on FE model and the triangle the nearest location resides are first calculated for each wrapper vertex. The same octree structure is used to quickly search nearby triangles on FE model. Then all vertices are moved to their destinations through the formula given below in Equation 1.

$$\vec{P_i} + \vec{D_i} + \frac{d}{|\vec{P_i D_i}|}(\vec{P_i} - \vec{D_i}) \quad \text{(Equation 1)}$$

In equation 1 above Pi is the i-th wrapper vertex to be projected, Di is its nearest location on the FE model, d is a given distance parameter, and P'i is the target location. The secondary correction first identifies a set of undesired initial projections. FIGS. 5a and 5b shows undesired initial projections. The identification is based on the computation of two quantities, projection angle Ai and maximal rotational angle βi as defined below.

$$\theta_i \stackrel{def}{=} \cos^{-1}\left(\frac{(\vec{P_i} - \vec{D_i}) \cdot \vec{n_i}}{|\vec{P_i D_i}| \cdot |\vec{n_i}|}\right) \quad \text{(Equation 2)}$$

Where $\vec{n_i}$, the normal at projected wrapper vertex Pi, is estimated in terms of (EQ-3).

$$\vec{n_i} = \sum_{j=1}^{k} A_j \vec{n_{ij}} \quad \text{(Equation 3)}$$

Figure 6:
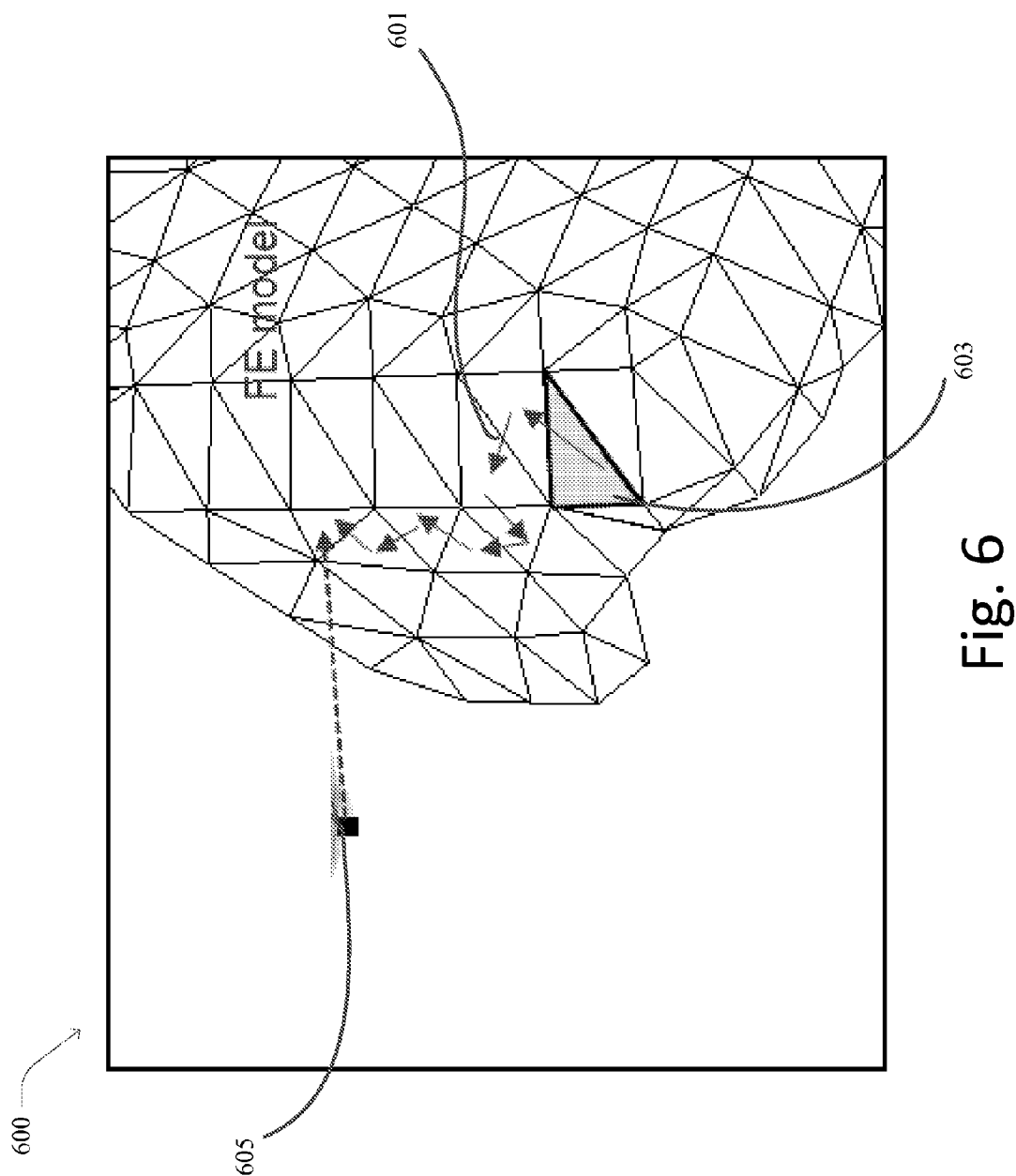
FIG. 6 illustrates an example seed based method according to an exemplary embodiment.

With k being the number of triangles adjacent to the i-th wrapper vertex, weight Aj (j=1,k) being the area of the j-th triangle, and $\vec{n_{ij}}$ is the unit normal vector of the j-th triangle.

$$\beta_i = \max\left(\cos^{-1}\left(\vec{n_{ij}} \cdot \vec{n_{ij}^0}\right)\right) \quad (j = 1, \ldots, k) \quad \text{(Equation 4)}$$

Where $\vec{n_{ij}}^0$ i is the unit normal vector of the j-th triangle with the position of the ith vertex at un-projected location. Note, βi is considered 180 degree if the area of any j-th triangle is zero. The secondary correction then computes a new destination for each undesired first projection using a seed based method according to an exemplary embodiment, and re-projects. FIG. 6 illustrates an example seed based method.

Since the wrapper surface usually stretched and contracted while shrinking (some triangles are degenerated into an edge or even a vertex, some are flipped, while some are extremely elongated), have to be improved using the local mesh modification procedures in the order as follows: 1. Detect and remove degenerated triangles by collapse and swap operations; 2. Detect and remove folded triangles by collapse and swap operations; and 3. Refine elongated edges and shrinking new vertices onto proper geometry edges on FE model.

Figure 7:
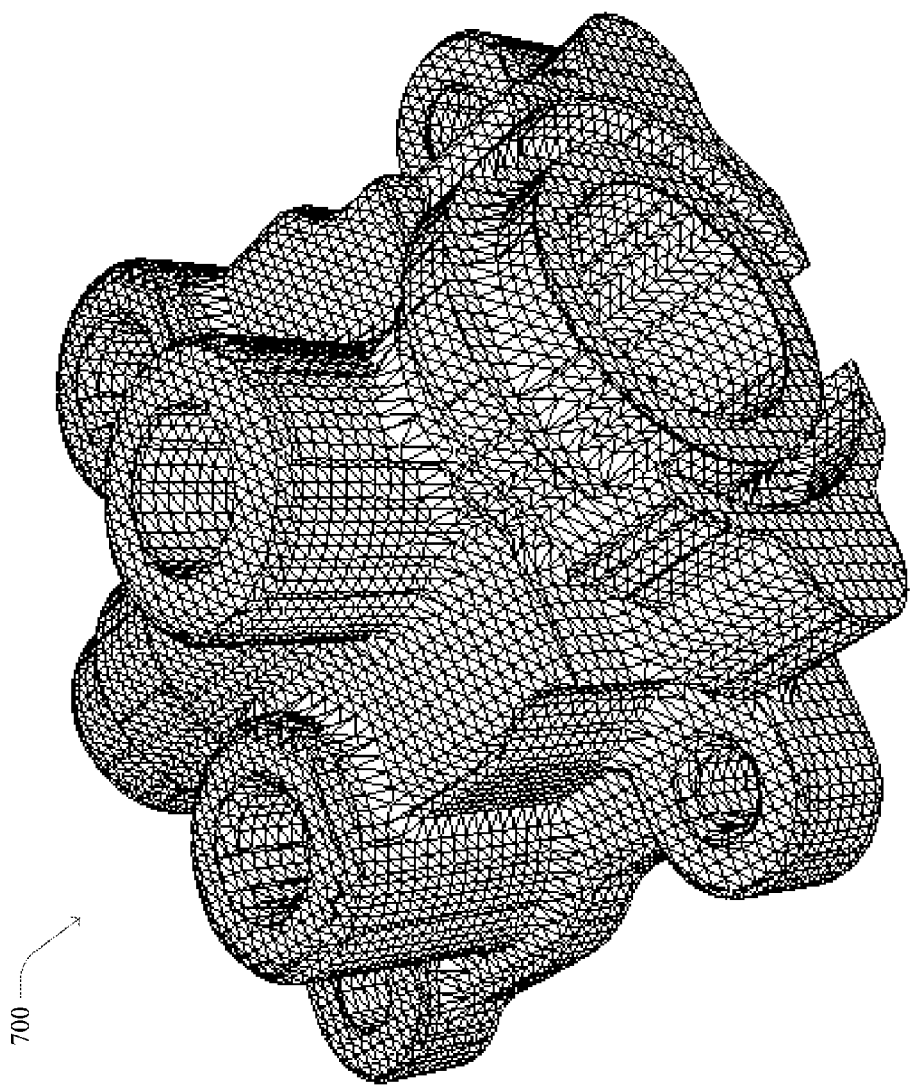
FIG. 7 illustrates an example wrapper for a model according to an exemplary embodiment.

FIG. 7 illustrates an example wrapper for a model according to an exemplary embodiment. FIG. 7 shows the model after the secondary projections.

Figure 8:
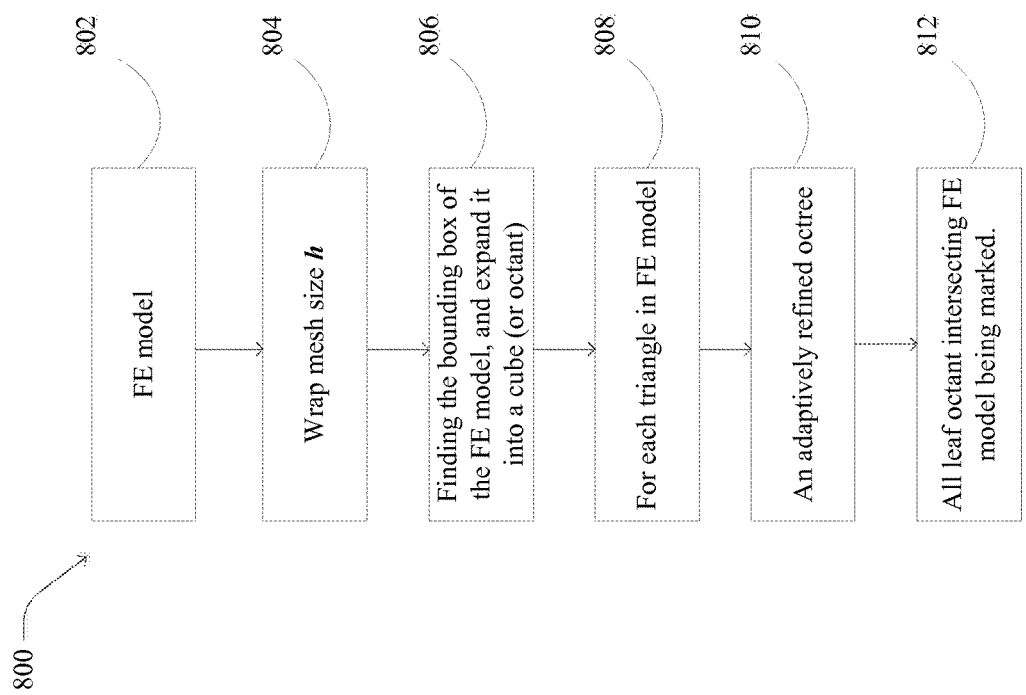
FIG. 8 is a flow chart illustrating a process for recursive octree construction according to an exemplary embodiment.

FIG. 8 is a flow chart illustrating a process 800 for recursive octree construction according to an exemplary embodiment. In process 800, at step 802 the FE model is received by the system 100. After receiving the FE model, the system 100 may wrap a mesh of size h (as specified by the user) at step 804. The root octant module 108 may find the bounding box of the FE model, and expand it into a cube (or octant), at step 806. Next at step 808, the root octant module 108 may generate a bounding box for each triangle in the FE model.

At step 808, the module 108 may determine whether a portion of the model is intersecting with or contained by the octant. Upon determining that the model is intersecting or contained by the wrapper the octant may be refined into eight child octants. Each child octant may be tested with the triangle for containment or intersection with the model. If the model is contained within a child octant or intersecting with a child octant and the child octant size is equal or less than size h, then the child octant may be marked. The next child octant may be processed in a similar manner as described. Step 808 may recursively refine the child octant. At step 810, the root octant module 108 may adaptively refine the octree. Each leaf octant that intersects the FE model may be marked, at step 812.

Figure 9:
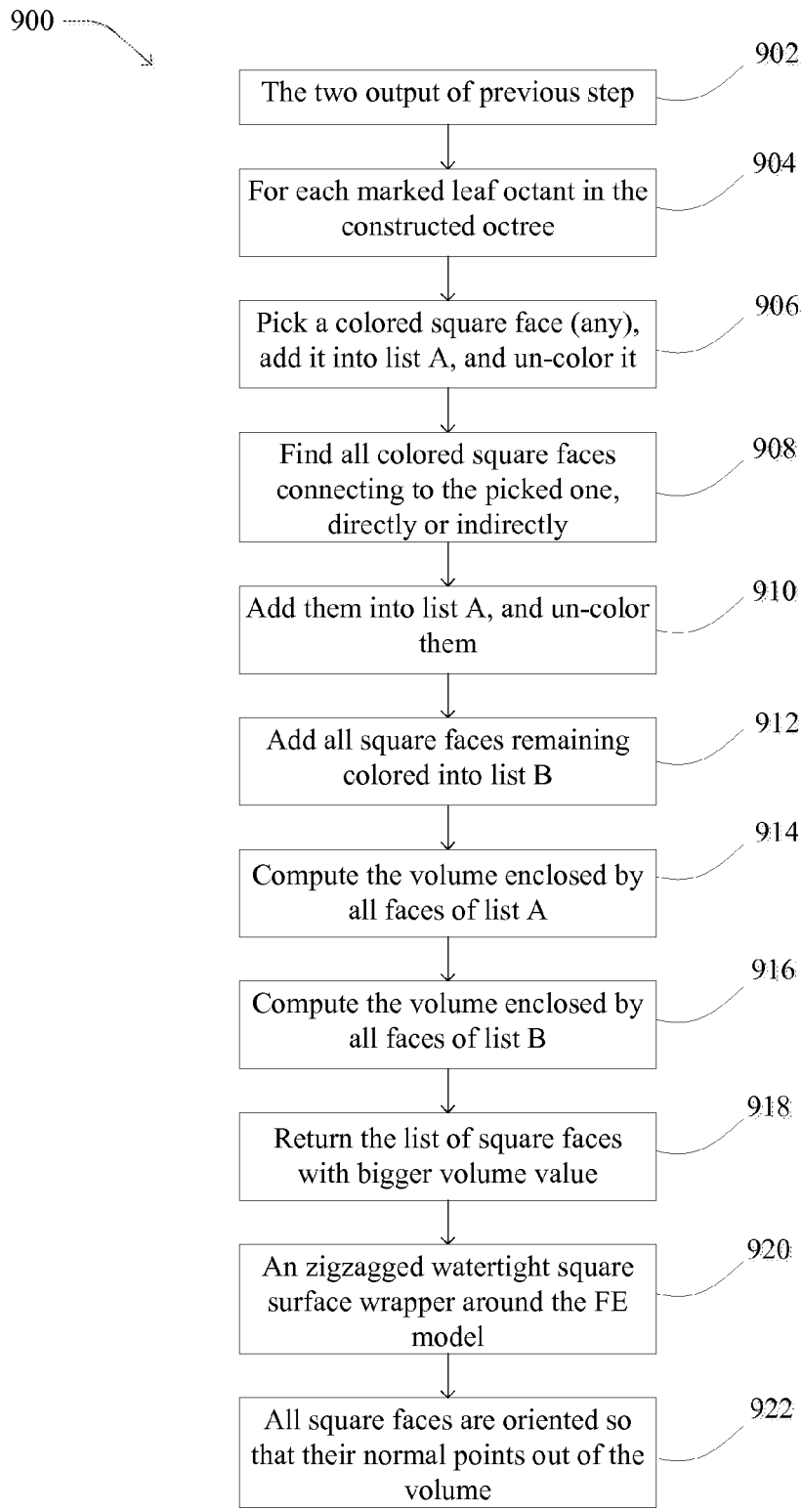
FIG. 9 is a flow chart illustrating a process for extracting a zigzagged outer octant skin according to an exemplary embodiment.

FIG. 9 is a flow chart illustrating a process 900 for extracting a zigzagged outer octant skin according to an exemplary embodiment. At step 902, the two outputs from steps 810 and 812 may be received by process 900. At step 904, for each marked leaf octant in the constructed octree and for each square face of the current leaf octant has been colored the color may be removed. If the square face has not been colored, then at step 904 the square face may be colored. At step 906, a colored square face may be selected and added to a list A, and uncolored after it has been added to a list A. At step 908, all colored square faces may be selected directly or indirectly. All colored squares may be added to list A and un-colored, at step 910. Next at step 912 all square faces remaining colored may be added to list B. At step 914, the volume enclosed by all faces in list A may be computed. At step 916, the volume enclosed by all faces of list B may be computed. At step 918, the process 900 may return the list of square faces with the larger volume. A zigzagged watertight square surface wrapper may be formed around the FE model at step 920. All square faces are oriented so that their normal points out of the volume at step 922.

Figure 10:
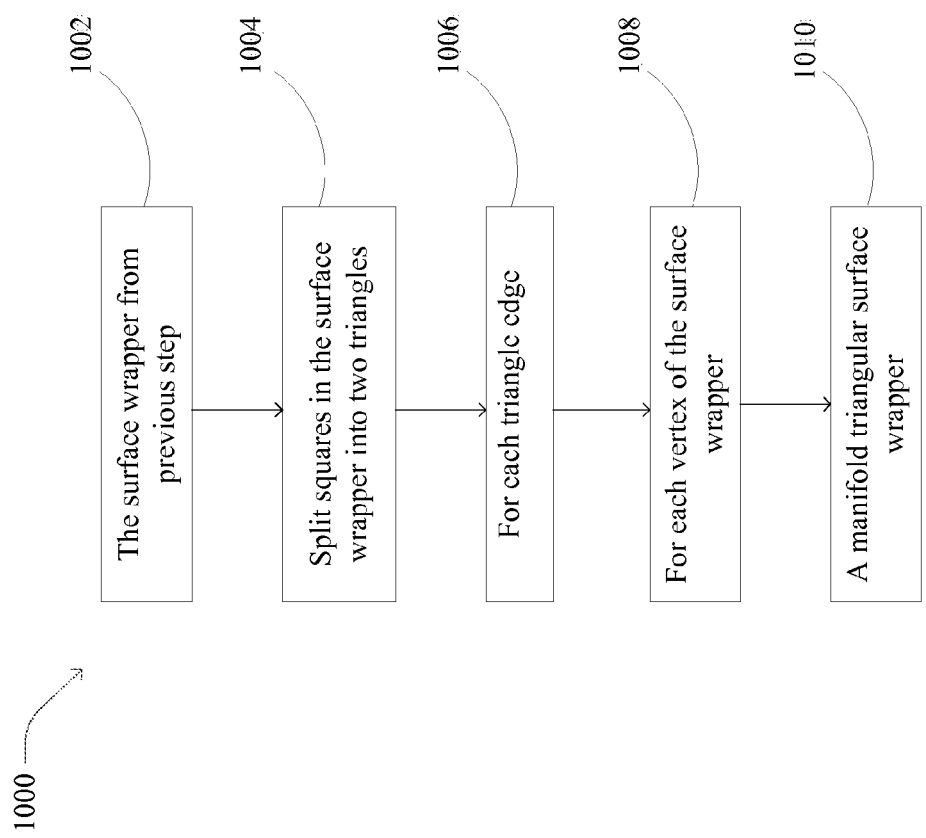
FIG. 10 is a flow chart illustrating a process for separating non-manifoldness according to an exemplary embodiment.

FIG. 10 is a flow chart illustrating a process 1000 for separating non-manifoldness according to an exemplary embodiment. At step 1002, the surface wrapper from process 900 may be received. At step 1004, the squares in the surface wrapper may be split into two triangles. Step 1006 includes steps 1008 and 1010. At step 1006, for each triangle edge get all of the faces that connect to the each triangle, and count the number of faces. If the count is four, divide the four faces into two pairs based on the orientation information of the faces. In one embodiment, one pair of faces may lie in on the opposite side of another one face. The current edge may be cloned making a pair of faces connecting to the clone. For each vertex of the surface wrapper add all connected faces into list A. In another embodiment, a face may be popped out of list A, and added to list B. For each remaining face in list A when the face is connected to a face in list B through a common edge remove the face from list A, and add the face into list B. If list A is not empty, clone the current vertex, and make faces of list A connecting to the clone. At step 1010, a manifold triangular surface wrapper may be output to process 1100.

Figure 11:
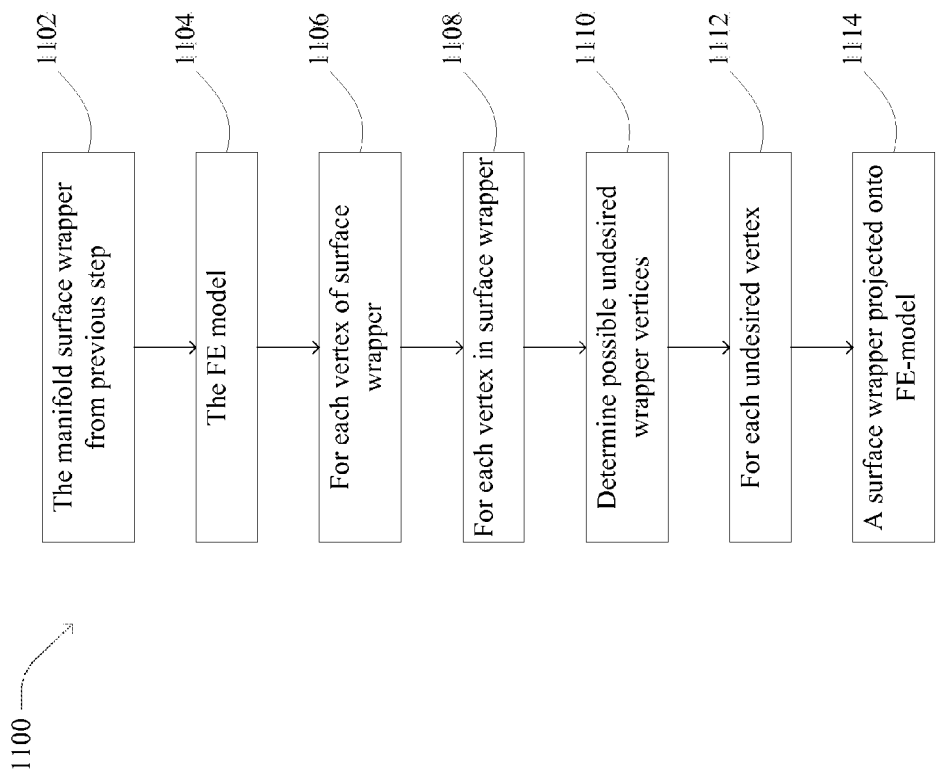
FIG. 11 is a flow chart illustrating a process for projecting the wrapper onto the model.

FIG. 11 is a flow chart illustrating a process for projecting the wrapper into the model. The manifold surface wrapper and the FE model from process 1000 may be received by process 1100. For each vertex of surface wrapper, a nearest location on FE model may be compute. For each vertex in the surface wrapper compute its target to project using Equation 1 above. Move the vertex to its target. Process 1100 may determine possible undesired wrapper vertices.

For each undesired vertex, the process 1100 may determine a seed face (or seed faces). A new target location may be computed using the seed-based method. Next, the system may compute the center of nearby vertices using Equation 5. The system 100 may compare the new target with the center, and move the vertex to the location that is closer to the center or at a more optimal location. The process 1100 may generate an output where the surface wrapper is projected on to the FE model.

Figure 12:
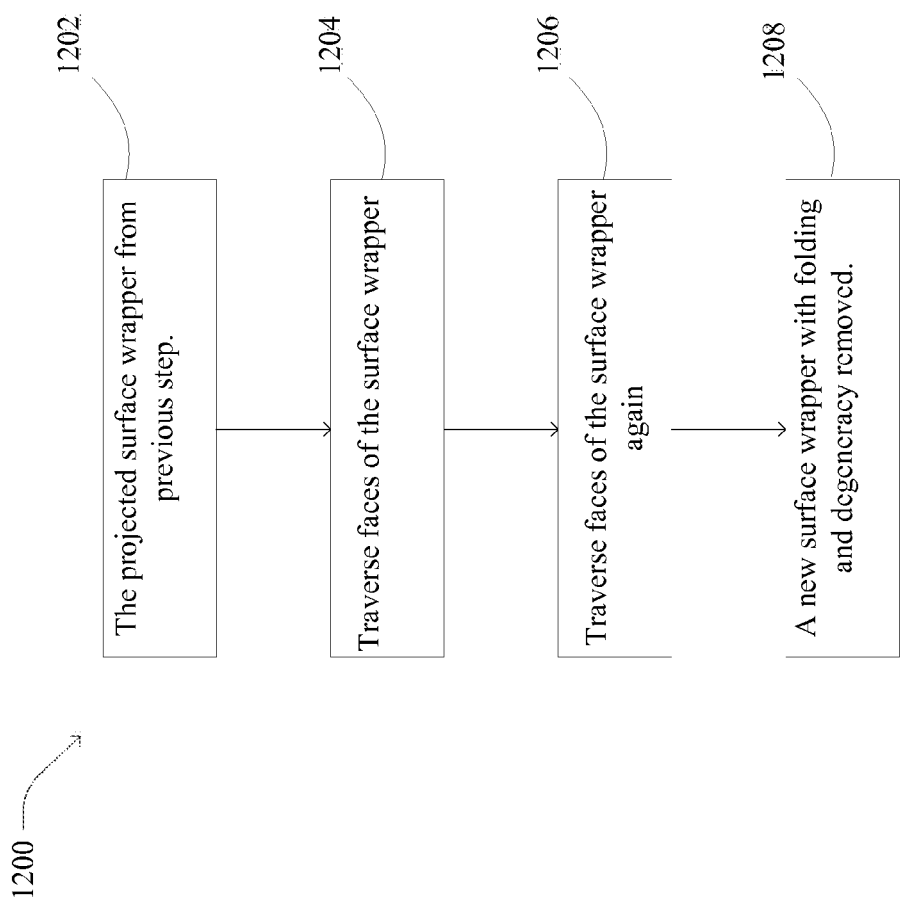
FIG. 12 is a flow chart illustrating a process removing folds and degeneracy according to an exemplary embodiment.

FIG. 12 is a flow chart illustrating a process removing folds and degeneracy according to an exemplary embodiment. Process 1200 may receive the output from process 1100. The process 1200 may traverse the faces of the surface wrapper and determine if the faces have degenerated into a segment or a point. If the faces have degenerated, then the process may execute collapsing or swapping operation to remove the face. The process 1200 may traverse the faces of the surface wrapper again and loop over edges of the face to compute the surface normal change across the edge. If any surface normal change is greater than 175 degrees, then the process may execute swap or collapse operation to remove the face. The output from process 1200 may be a new surface wrapper with folds and degeneracies removed.

Figure 13:
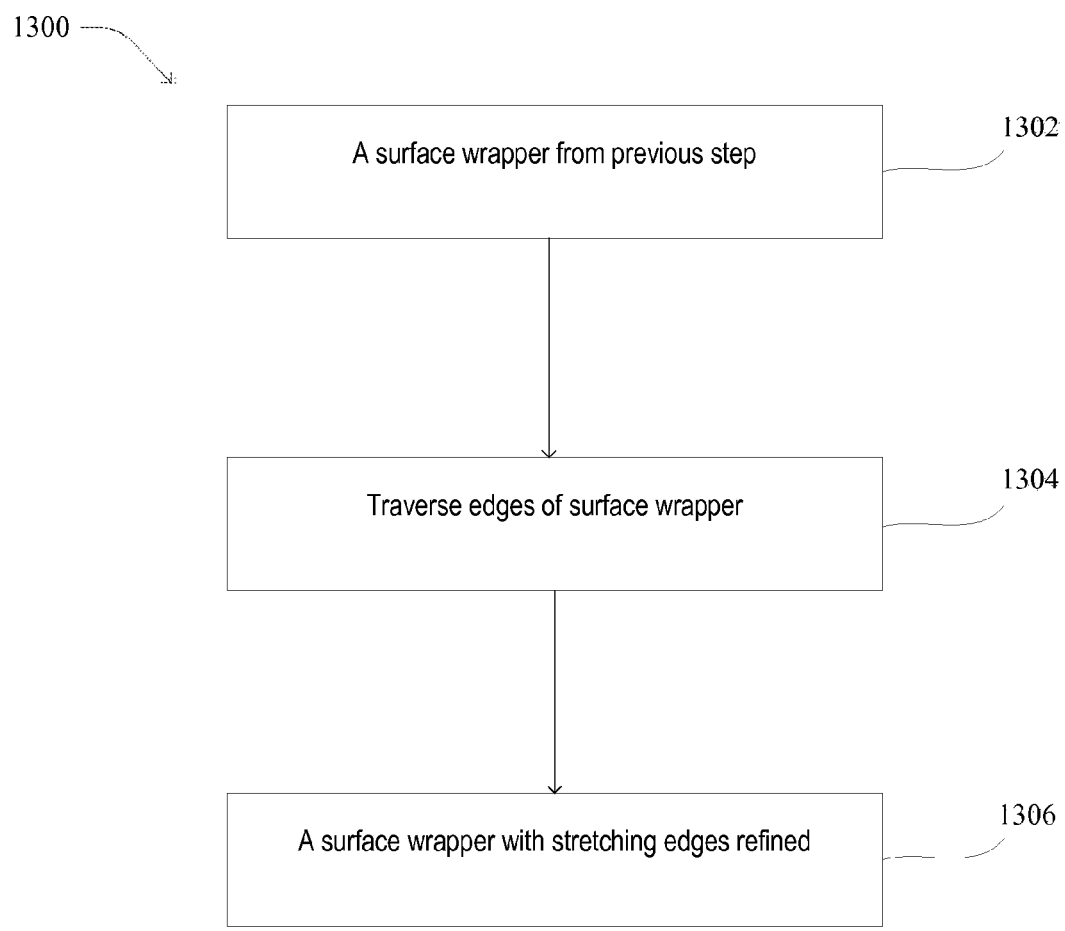
FIG. 13 is a flow chart illustrating a process for correcting the wrapper to avoid extreme stretching.

FIG. 13 is a flow chart illustrating a process 1300 for correcting the wrapper to avoid extreme stretching. The process 1300 may receive the output from process 1200 as input in one embodiment. Process 1300 includes traversing edges of surface wrapper. The process 1300 may identify the two end vertices of an edge, determine two FE model faces associated with the two end vertices. The process 1300 may include the two geometry faces associated with these two FE-model faces. If the two associated geometry faces is different, or the edge length is longer than 1.5 h (h is the input mesh size parameter), then the system 1300 splits the edge at its middle point, computes a target location to project the middle points using the two FE model faces as seed and move the middle onto the target location. The process 1300 may be repeated as needed for new edges. The output from process 1300 may be a surface wrapper with stretching edges refined.

The terms "module", "system", "logic", "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, networked systems or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions may be executed on any type of computing device (e.g., computer, laptop, etc.) or may be embedded on any type of electronic device (e.g., a portable storage device such as a flash drive, etc.).

Although the figures may show a specific order of method steps, the order of the steps may differ from what is depicted. Also, two or more steps may be performed concurrently or with partial concurrence. Such variation will depend on the software and hardware systems chosen and on designer choice. The results of analysis by system 10 can be provided in reports or displayed in accordance with CAE and CAD operations. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for generating a shrink wrap around a model of a physical object, comprising:
   receiving a mesh size of a wrapper;
   receiving a distance from the wrapper to the model;
   generating the wrapper around the model using an octree structure, wherein the wrapper has a mesh size that is close to the received mesh size, and the wrapper has a distance to the model that is equal to the received distance;

outputting an adaptively refined octree with all leaf octants that intersect with the model marked, the adaptively refined octree being refined from the octree structure;

shrinking the wrapper toward the model to obtain the shrink wrap, wherein shrinking the wrapper comprises:

generating a first projection for the wrapper by moving each wrapper vertex towards a nearest location on the model using the octree structure;

determining a set of wrapper vertices for reprojection based on the computation of a projection angle and a rotational angle;

generating a second projection for the set of wrapper vertices using a seed-based closest point method or a center of adjacent wrapper vertices for the second projection.

2. The method of claim 1, wherein the maximum projection angle threshold value is 60 degrees.

3. The method of claim 1, wherein the maximum rotational angle threshold value is 175 degrees.

4. The method of claim 1, wherein the seed-based closest point method comprises:

projecting one of the wrapper vertices into a seed face;

reprojecting the one of the wrapper vertices after detecting that the projected vertex is located outside a neighboring mesh element that is closest to the projection location until the one of the wrapper vertices is located inside the neighboring mesh element.

5. The method of claim 1, further comprising detecting non-manifold edges in the wrapper by counting a number of faces adjacent to each edge.

6. The method of claim 5, further comprising reconnecting the non-manifold edges after separating or cloning the non-manifold edges or cloning one of the wrapper vertices shared by the non-manifold edges.

7. The method of claim 1, further comprising displaying simulation results of a simulation.

8. A method for generating a shrink wrap around a model of a physical object, comprising:

receiving a mesh size of a wrapper;

receiving a distance from the wrapper to the model;

generating the wrapper with a mesh size that is less than the received mesh size and the wrapper having a distance to the model that is less than the received distance;

outputting an adaptively refined octree with all leaf octants that intersect with the model marked, the adaptively refined octree being refined from an octree structure;

detecting non-manifold edges in the wrapper by counting a number of faces adjacent to each of the non-manifold edges;

reconnecting the non-manifold edges after separating or cloning the non-manifold edges or cloning wrapper vertices shared by the non-manifold edges;

generating a first projection for the wrapper around the model by moving each wrapper vertex towards a nearest location on the model, the first projection comprising a projection angle and a rotational angle;

determining a set of the wrapper vertices for reprojection based at least partially on the projection angle exceeding a maximum projection angle threshold value or the rotational angle exceeding a maximum rotational angle threshold value;

generating a second projection for the set of wrapper vertices using a seed-based closest point method or a center of the adjacent wrapper vertices for the second projection;

generating the shrink wrap based on the second projection.

9. The method of claim 8, wherein the maximum projection angle threshold value is 60 degrees.

10. The method of claim 8, wherein the maximum rotational angle threshold value is 175 degrees.

11. The method of claim 8, wherein the seed-based closest point method comprises:

projecting one of the wrapper vertices into a seed face;

reprojecting the one of the wrapper vertices after detecting that the projected vertex is located outside a neighboring mesh element that is closest to the projection location until the one of the wrapper vertices is located inside the neighboring mesh element.

12. A non-transitory computer-readable storage medium having machine instructions stored therein, the instructions being executable by a processor to cause the processor to perform operations for generating a shrink wrap around a model of a physical object, comprising:

receiving a mesh size of a wrapper;

receiving a distance from the wrapper to the model;

generating the wrapper around the model using an octree structure, wherein the wrapper has a mesh size that is close to the received mesh size, and the wrapper has a distance to the model that is equal to the received distance;

outputting an adaptively refined octree with all leaf octants that intersect with the model marked, the adaptively refined octree being refined from the octree structure;

shrinking the wrapper toward the model to obtain the shrink wrap, wherein shrinking the wrapper comprises:

generating a first projection for the wrapper by moving each wrapper vertex towards a nearest location on the model using the octree structure;

determining a set of wrapper vertices for reprojection based on the computation of a projection angle and a rotational angle;

generating a second projection for the set of wrapper vertices using a seed-based closest point method or a center of the adjacent wrapper vertices for the second projection.

13. The non-transitory computer-readable storage medium of claim 12, wherein the maximum projection angle threshold value is 60 degrees.

14. The non-transitory computer-readable storage medium of claim 12, wherein the maximum rotational angle threshold value is 175 degrees.

15. The non-transitory computer-readable storage medium of claim 12, wherein the seed-based closest point method comprises:

projecting one of the wrapper vertices into a seed face;

reprojecting the one of the wrapper vertices after detecting that the projected vertex is located outside a neighboring mesh element that is closest to the projection location until the one of the wrapper vertices is located inside the neighboring mesh element.

\* \* \* \* \*